US008111889B2

(12) United States Patent
Basu et al.

(10) Patent No.: US 8,111,889 B2
(45) Date of Patent: Feb. 7, 2012

(54) METHOD AND APPARATUS FOR EFFICIENT CALCULATION AND USE OF RECONSTRUCTED PIXEL VARIANCE IN TOMOGRAPHY IMAGES

(75) Inventors: Samit Kumar Basu, Niskayuna, NY (US); Bruno Kristiaan Bernard De Man, Clifton Park, NY (US); Peter Michael Edic, Albany, NY (US); Ricardo Scott Avila, Clifton Park, NY (US); James Vradenburg Miller, Clifton Park, NY (US); Colin Craig McCulloch, Ballston Lake, NY (US); Deborah Joy Walter, Burnt Hills, NY (US); Paulo Ricardo dos Santos Mendonca, Clifton Park, NY (US); William Macomber Leue, Albany, NY (US); Thomas Baby Sebastian, Flemington, NJ (US)

(73) Assignee: General Electric Company, Niskayuna, NY (US)

( * ) Notice: Subject to any disclaimer, the term of this patent is extended or adjusted under 35 U.S.C. 154(b) by 2379 days.

(21) Appl. No.: 10/813,758

(22) Filed: Mar. 31, 2004

(65) Prior Publication Data

US 2005/0226484 A1    Oct. 13, 2005

(51) Int. Cl.
   *G06K 9/00*    (2006.01)
(52) U.S. Cl. .................. 382/131; 382/130; 382/132
(58) Field of Classification Search .......... 382/100, 382/131, 195, 223, 217, 128, 210, 134, 103; 378/5–8, 51; 250/363.04, 370.09, 390.02
See application file for complete search history.

(56) References Cited

U.S. PATENT DOCUMENTS

| | | | | |
|---|---|---|---|---|
| 5,463,667 A * | 10/1995 | Ichinose et al. | ................ | 378/58 |
| 6,026,171 A * | 2/2000 | Hiraoglu et al. | ............. | 382/100 |
| 6,580,777 B1 * | 6/2003 | Ueki et al. | ...................... | 378/17 |
| 7,003,136 B1 * | 2/2006 | Harville | ........................ | 382/103 |
| 7,023,951 B2 * | 4/2006 | Man | ................ | 378/8 |
| 7,103,137 B2 * | 9/2006 | Seppi et al. | ...................... | 378/9 |
| 7,177,390 B2 * | 2/2007 | Martin et al. | ................... | 378/25 |
| 7,187,794 B2 * | 3/2007 | Liang et al. | ................... | 382/131 |
| 7,356,174 B2 * | 4/2008 | Leue et al. | ...................... | 382/131 |
| 7,369,640 B2 * | 5/2008 | Seppi et al. | ...................... | 378/9 |
| 7,376,255 B2 * | 5/2008 | De Man et al. | .............. | 382/131 |
| 7,672,421 B2 * | 3/2010 | Chen et al. | ........................ | 378/4 |

(Continued)

OTHER PUBLICATIONS

Bennett, et al "Fan-beam-tomography noise theory", Opt. Soceity Am.A/vol. 3 No. 5, May 1986.
Oleh J Tretiak "Noise Limitations in X-Ray Computed Tomography", Journal of Computer Assisted Tomography, 2, pp. 477-480, Sep. 1978.
Brooks, et al "Statistical Limitations in X-ray reconstructive tomography", Medical Physics, vol. 3, No. 4, pp. 237-240, Jul./Aug. 1976.

*Primary Examiner* — Daniel Mariam
*Assistant Examiner* — Nancy Bitar
(74) *Attorney, Agent, or Firm* — Seema Katragadda (57) ABSTRACT

A technique is disclosed for generating variance data and a variance map from measured projection data acquired from a tomography system. The method comprises accessing the measured projection data from the tomography system. The method further comprises generating the variance map from the measured projection data and displaying, analyzing or processing the variance map. The variance data is determined based upon a statistical model from measured image data, and may be used for image analysis, data acquisition, in computer aided diagnosis routines, and so forth.

19 Claims, 5 Drawing Sheets

U.S. PATENT DOCUMENTS

| | | |
|---|---|---|
| 2003/0076988 A1* | 4/2003 | Liang et al. .................. 382/131 |
| 2003/0156684 A1* | 8/2003 | Fessler .......................... 378/210 |
| 2004/0120454 A1* | 6/2004 | Ellenbogen et al. ............ 378/19 |
| 2005/0031075 A1* | 2/2005 | Hopkins et al. ................ 378/57 |
| 2005/0111610 A1* | 5/2005 | De Man et al. ................ 378/10 |
| 2005/0123089 A1* | 6/2005 | Man ................................. 378/4 |
| 2005/0152504 A1* | 7/2005 | Shih ............................. 378/210 |
| 2005/0249416 A1* | 11/2005 | Leue et al. .................... 382/195 |
| 2007/0297656 A1* | 12/2007 | DeMan et al. ................ 382/128 |
| 2008/0165920 A1* | 7/2008 | De Man et al. ................ 378/17 |

\* cited by examiner

METHOD AND APPARATUS FOR EFFICIENT CALCULATION AND USE OF RECONSTRUCTED PIXEL VARIANCE IN TOMOGRAPHY IMAGES

BACKGROUND OF THE INVENTION

The present invention generally relates to the field of image reconstruction in tomography systems, and more particularly to a method and apparatus for efficient calculation and use of reconstructed pixel variance data in tomography images.

Tomography systems operate by projecting fan shaped or cone shaped X-ray beams through an object. The X-ray beams are generated by an X-ray source, and are generally collimated prior to passing through the object being scanned. The attenuated beams are then detected by a set of detector elements. The detector elements produce a signal based on the intensity of the attenuated X-ray beams, and the signals are processed to produce projection data or images. By using reconstruction techniques such as filtered backprojection, useful images are formed from these projection data.

A computer is able to process and reconstruct images of the portions of the object responsible for the radiation attenuation. As will be appreciated by those skilled in the art, these images are computed by processing a series of angularly displaced projection images. This data is then reconstructed to produce the reconstructed image, which is typically displayed on a cathode ray tube, and may be printed or reproduced on film.

Traditional reconstruction techniques comprise reconstructing the mean number at each pixel. However, there is variability in that value caused by noise processes such as photon noise (X-ray noise), quantization noise and electronic noise in the projection measurements which impact the reconstructed images. It is therefore advantageous not only to reconstruct the mean number in an image, but also the variance associated with each pixel within that image for improved image analysis. In addition, a point-wise variance estimate for each pixel also provides additional diagnostic information about the reconstructed image.

One way of generating a variance image is to take an ensemble of images, reconstruct each image, and then compute the variance for each pixel in the reconstruction over the ensemble of datasets. However, a disadvantage with this technique is that repeated scanning is needed to acquire the multiple datasets, thereby making it computationally inefficient and impractical for clinical applications. A computationally efficient method for determining pixel variance data and generating variance images is therefore desired. It would also be useful to develop ways to use and apply such information, such as in the analysis of reconstructed tomography images, or for improved image acquisition or reconstruction.

BRIEF DESCRIPTION OF THE INVENTION

The present invention provides techniques for generating variance data and variance maps to respond to such needs. In accordance with one aspect of the present technique, a method and computer readable medium for generating variance image data from projection data acquired from a tomography system is provided. The method comprises accessing the projection data from the tomography system. The method further comprises generating the variance image data or variance measures from the projection data, and displaying or processing the variance image data. The data may be used to form a variance map for analysis, display or other uses.

In accordance with another aspect of the present technique, a system for generating variance image data from measured projection data acquired from a tomography system is provided. The system comprises an X-ray source configured to project a plurality of X-ray beams through an object and a detector configured to produce a plurality of electrical signals in response to received X-ray beams from the source. The system further comprises a processor configured to process the plurality of electrical signals to generate measured projection data. The processor is further configured to access the measured projection data from the tomography system, formulate a variance measure based upon the measured projection data and generate a variance map based upon the variance measure using a suitably modified reconstruction algorithm. Again, the variance map may be processed or used for display and analysis, or for other applications.

BRIEF DESCRIPTION OF THE DRAWINGS

The foregoing and other advantages and features of the invention will become apparent upon reading the following detailed description and upon reference to the drawings in which.

DETAILED DESCRIPTION OF SPECIFIC EMBODIMENTS

Figure 1:
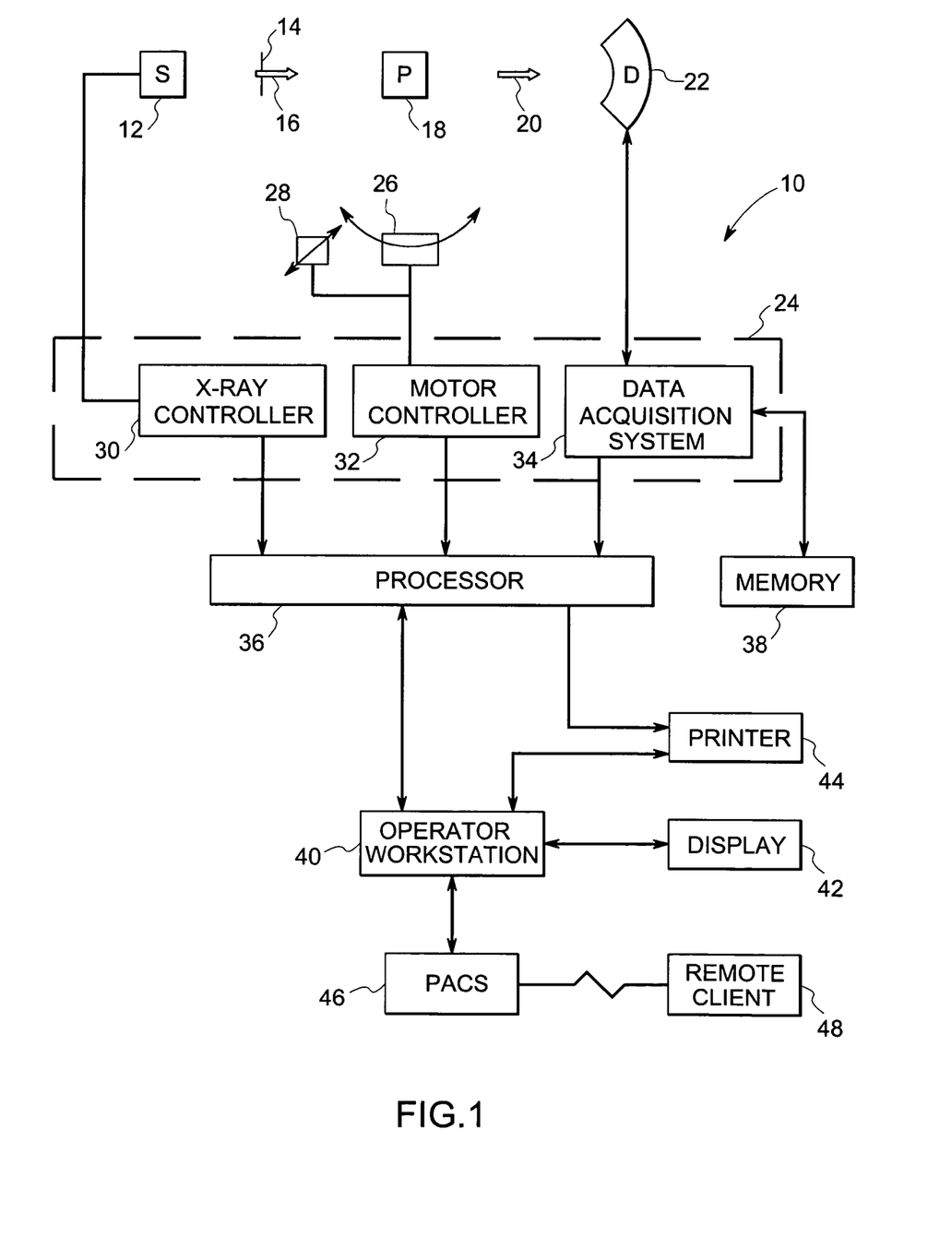
FIG. 1 is a diagrammatical view of an exemplary imaging system in the form of a CT imaging system for use in producing images and generating variance image data and maps in accordance with aspects of the present technique.

FIG. 1 illustrates diagrammatically an imaging system 10 for acquiring and processing projection data and variance data to produce reconstructed images and variance maps. In the illustrated embodiment, system 10 is a computed tomography (CT) system designed both to acquire original image data, and to process the image data for display and analysis in accordance with the present technique. In addition, the system 10 is designed to formulate variance data or variance measures from original projection data, process the variance measures and generate a variance map for display and analysis in accordance with the present technique. In the embodiment illustrated in FIG. 1, imaging system 10 includes a source of X-ray radiation 12 positioned adjacent to a collimator 14. In this exemplary embodiment, the source of X-ray radiation source 12 is typically an X-ray tube.

Collimator 14 permits a stream of radiation 16 to pass into a region in which an object, for example, a subject of interest 18 is positioned. A portion of the radiation 20 passes through or around the subject and impacts a detector array, represented generally at reference numeral 22. Detector elements of the array produce electrical signals that represent the intensity of the incident X-ray beam. These signals are acquired and processed to reconstruct images of the features within the subject 18.

Source 12 is controlled by a system controller 24, which furnishes both power, and control signals for CT examination sequences. Moreover, detector 22 is coupled to the system controller 24, which commands acquisition of the signals generated in the detector 22. The system controller 24 may also execute various signal processing and filtration functions, such as for initial adjustment of dynamic ranges, interleaving of digital image data, and so forth. In general, system controller 24 commands operation of the imaging system to execute examination protocols and to process acquired data. In the present context, system controller 24 also includes signal processing circuitry, typically based upon a general purpose or application-specific digital computer, associated memory circuitry for storing programs and routines executed by the computer, as well as configuration parameters and image data, interface circuits, and so forth.

In the embodiment illustrated in FIG. 1, system controller 24 is coupled to a rotational subsystem 26 and a linear positioning subsystem 28. The rotational subsystem 26 enables the X-ray source 12, collimator 14 and the detector 22 to be rotated one or multiple turns around the subject 18. It should be noted that the rotational subsystem 26 might include a gantry. Thus, the system controller 24 may be utilized to operate the gantry. The positioning subsystem 28 enables the subject 18, or more specifically a table, to be displaced within an opening in the CT system 10. Thus, the table may be linearly moved within the gantry to generate images of particular areas of the subject 18.

Additionally, as will be appreciated by those skilled in the art, the source of radiation may be controlled by an X-ray controller 30 disposed within the system controller 24. Particularly, the X-ray controller 30 is configured to provide power and timing signals to the X-ray source 12. A motor controller 32 may be utilized to control the movement of the rotational subsystem 26 and the linear positioning subsystem 28.

Further, the system controller 24 is also illustrated comprising a data acquisition system 34. In this exemplary embodiment, the detector 22 is coupled to the system controller 24, and more particularly to the data acquisition system 34. The data acquisition system 34 receives data collected by readout electronics of the detector 22. The data acquisition system 34 typically receives sampled analog signals from the detector 22 and converts the data to digital signals for subsequent processing by a processor 36.

The processor 36 is typically coupled to the system controller 24. The data collected by the data acquisition system 34 may be transmitted to the processor 36 and moreover, to a memory 38. It should be understood that any type of memory to store a large amount of data might be utilized by such an exemplary system 10. Moreover, the memory 38 may be located at this acquisition system or may include remote components for storing data, processing parameters, and routines described below. Also the processor 36 is configured to receive commands and scanning parameters from an operator via an operator workstation 40 typically equipped with a keyboard and other input devices. An operator may control the system 10 via the input devices. Thus, the operator may observe the reconstructed images and other data relevant to the system from processor 36, initiate imaging, and so forth.

A display 42 coupled to the operator workstation 40 may be utilized to observe the reconstructed image and the reconstructed variance map and to control imaging. Additionally, the images may also be printed by a printer 44 which may be coupled to the operator workstation 40. The display 42 and printer 44 may also be connected to the processor 36, either directly or via the operator workstation 40. Further, the operator workstation 40 may also be coupled to a picture archiving and communications system (PACS) 46. It should be noted that PACS 46 might be coupled to a remote client 48, radiology department information system (RIS), hospital information system (HIS) or to an internal or external network, so that others at different locations may gain access to the image, the image data, and optionally the variance data.

It should be further noted that the processor 36 and operator workstation 40 may be coupled to other output devices, which may include standard or special purpose computer monitors and associated processing circuitry. One or more operator workstations 40 may be further linked in the system for outputting system parameters, requesting examinations, viewing images, and so forth. In general, displays, printers, workstations, and similar devices supplied within the system may be local to the data acquisition components, or may be remote from these components, such as elsewhere within an institution or hospital, or in an entirely different location, linked to the image acquisition system via one or more configurable networks, such as the Internet, virtual private networks, and so forth.

Figure 2:
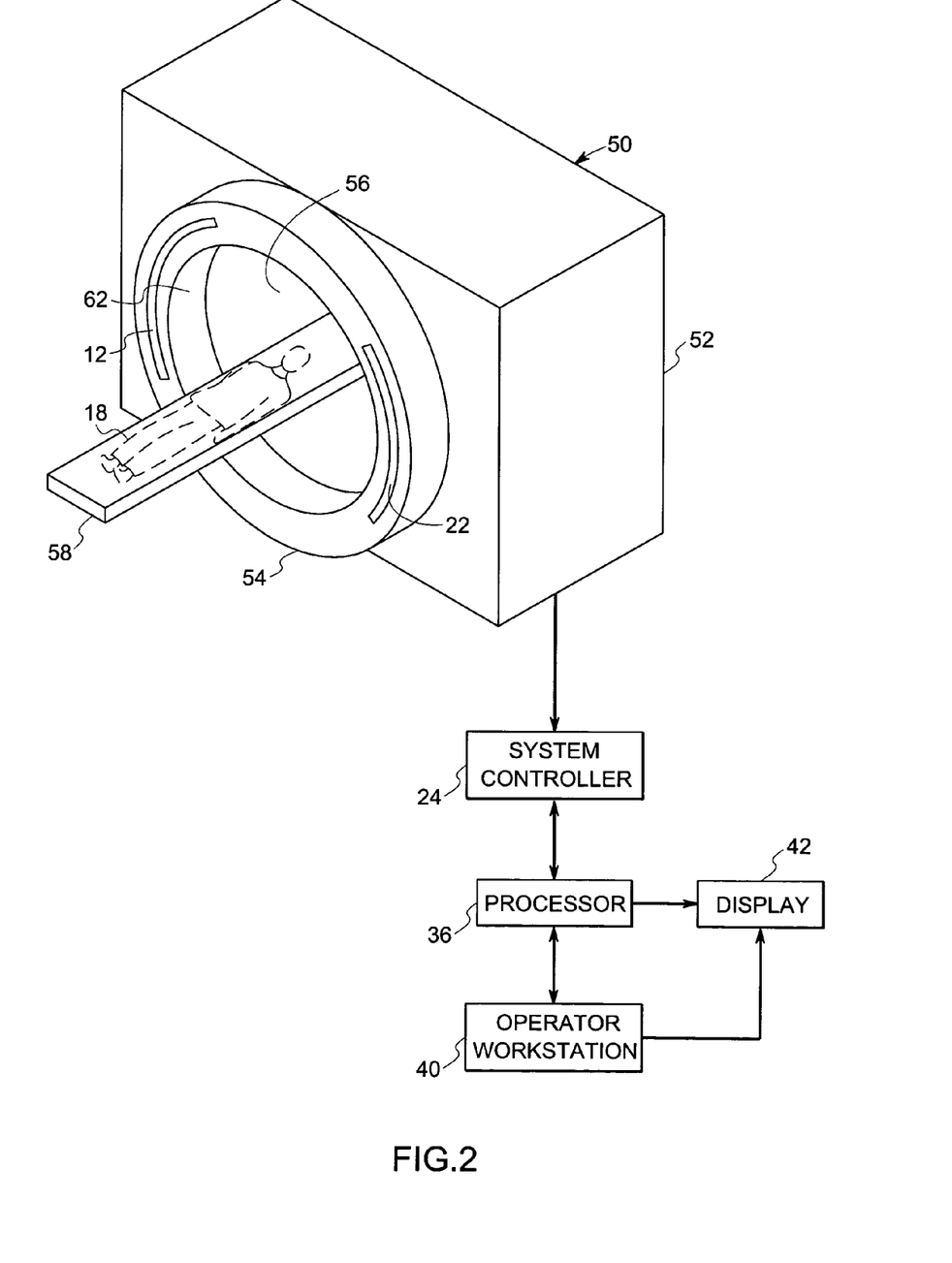
FIG. 2 is another diagrammatical view of a physical implementation of the CT system of FIG. 1.

Referring generally to FIG. 2, an exemplary imaging system utilized in a present embodiment may be a CT scanning system 50. The CT scanning system 50 is typically a multi-slice detector CT (MDCT) system that offers a wide array of axial coverage, high gantry rotational speed, and high spatial resolution. The CT scanning system 50 is illustrated with a frame 52 and a gantry 54 that has an aperture 56. The aperture 56 may typically be 50 cm in diameter. Further, a table 58 is illustrated positioned in the aperture 56 of the frame 52 and the gantry 54. Additionally, the table 58 is configured to be displaced within the aperture 56 by the positioning subsystem 28 (see FIG. 1). The gantry 54 is illustrated with the source of radiation 12, typically an X-ray tube that emits X-ray radiation from a focal point 62. In typical operation, X-ray source 12 projects an X-ray beam from the focal point 62 toward the detector array 22. The detector 22 is generally formed by a plurality of detector elements, which sense the X-ray beams that pass through and around a subject of interest. Each detector element produces an electrical signal that represents the intensity of the X-ray beam at the position of the element during the time the beam strikes the detector. Furthermore, the gantry 54 is rotated around the subject of interest so that a plurality of radiographic views may be collected by the processor 36. Thus, an image or slice is computed which may incorporate, in certain modes, less or more than 360 degrees of projection data, to formulate an image. The image is collimated to desired dimensions, using shutters positioned in front of X-ray source 12. The collimator 14 (see FIG. 1) typically defines the size and shape of the X-ray beam that emerges from the X-ray source 12. Thus, as the X-ray source 12 and the detector 22 rotate, the detector 22 collects data of the X-ray beam intensities.

Data collected from the detector 22 then undergoes pre-processing and calibration to condition the data to represent the line integrals of the attenuation of the scanned objects.

The processed data, commonly called projections are then processed to formulate an image of the scanned area, for example using a filtered backprojection reconstruction technique. As mentioned above, the processor 36 (FIG. 1) is typically used to control the entire CT system 10. The main processor that controls the operation of the system may be adapted to control features enabled by the system controller 24. Further, the operator workstation 40 is coupled to the processor 36 as well as to the display 42, so that the reconstructed image may be viewed.

Alternatively, some or all of the processing described herein may be performed remotely by additional computing resources based upon raw or partially processed image data. In accordance with the present technique, the processor is configured to generate reconstructed image data and variance image data using the technique as described in subsequent paragraphs.

While in the present discussion reference is made to a CT scanning system in which a source and detector rotate on a gantry arrangement, it should be borne in mind that the present technique is not limited to data collected on any particular type of scanner. For example, the technique may be applied to data collected via a scanner in which an X-ray source and a detector are effectively stationary and an object is rotated, or in which the detector is stationary but an X-ray source rotates. Further, the data could originate in a scanner in which both the X-ray source and detector are stationary, as where the X-ray source is distributed and can generate X-rays at different locations. Similarly, while generally circular scan geometries are discussed herein, other geometries may be envisioned as well. Once reconstructed, the image produced by the system of FIGS. 1 and 2 reveals internal features of an object. Further, the present technique could apply to three-dimensional or cone beam acquisitions as well as to two-dimensional acquisitions. In brief, it should be borne in mind that the systems of FIG. 1 and FIG. 2 are described herein as exemplary systems only. Other system configurations and operational principles may, of course, be envisaged for acquiring and processing image data and variance data and for utilizing the data as discussed below. In particular, data acquired from other imaging modalities, such as with nuclear imaging or positron emission tomography, may be utilized in the manner discussed below.

Figure 3:
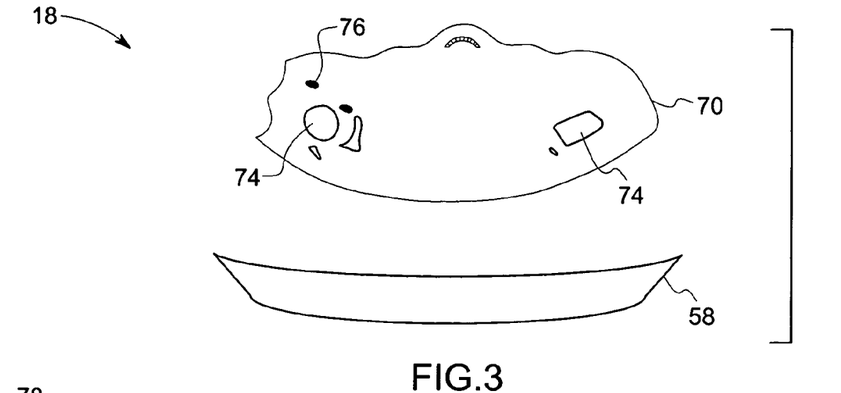
FIG. 3 is a cross-sectional view of an exemplary image of a neck-shoulder region of a subject of interest, acquired via an imaging system of the type shown in FIG. 1.

FIG. 3 is a partial image 70 illustrating a reconstructed slice of a neck-shoulder region of a subject of interest 18, acquired via an imaging system 10 of the type shown in FIG. 1. With reference to FIG. 1, system 10 acquires image data, processes it and forwards it to the data processing circuitry 36 where additional processing and analysis of the image data are performed. The images are typically analyzed for the presence of anomalies or indications of one or more features of interest, such as pathologies in a medical context. It should be noted, however, that the present techniques are in no way limited to the medical field or to any specific application.

Referring again to FIG. 3, reference numeral 74 represents internal features in the image 70 of the subject of interest 18. Reference numeral 76 represents a location of a high density object or a special object, such as an anomaly, lesion or a metal object in the subject. As will be appreciated by those skilled in the art, the image 70 depicting the neck-shoulder region of the subject is for illustrative purposes only and is not meant to limit the analysis of other types of images by the imaging system 10 such as for example, the heart, colon, limbs, breast, lungs or brain.

As will be appreciated by those skilled in the art, projection data from X-ray based technologies such as CT, are subject to random fluctuations in their measurements that generally result in noise such as photon (X-ray) noise, quantum noise or electronic noise. Noise in projection measurements causes randomness in the reconstructed CT image attenuation values or, equivalently, in the CT estimated pixel values, resulting in variability in the reconstructed pixel values. One way of measuring how this noise is propagated into the final reconstructed image is to compute the variance associated with each pixel. The present technique, as described more fully below, includes an efficient approach for processing measured data and for generating variance data from measured projection image data, permitting the effective diagnosis and analysis of image features and objects, including high density objects in reconstructed images, as well as other benefits.

Figure 4:
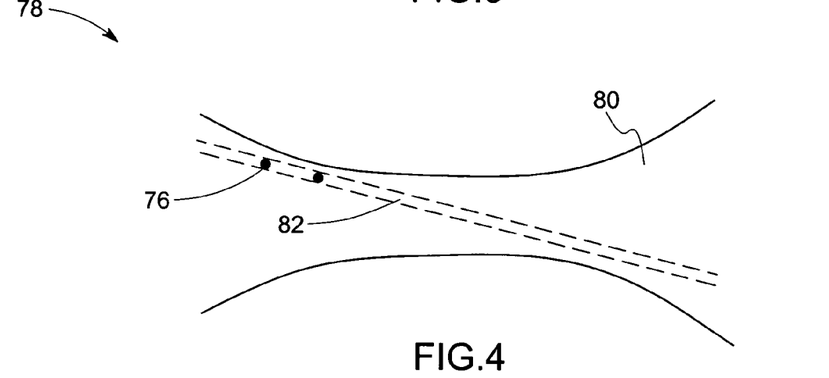
FIG. 4 is a diagrammatical representation of an exemplary variance map generated by the system of the type shown in FIG. 1 for the exemplary image shown in FIG. 3.

FIG. 4 is a diagrammatical representation of a variance map 78 generated by the system 10 of the type shown in FIG. 1, based upon variance data computed as described below. The variance map 78 of FIG. 4 corresponds to the region shown in the partial image 70 of FIG. 3. As indicated in FIG. 4, reference numeral 80 represents a region of relatively high variance in the variance map 78. Although variance is computed on a pixel-by-pixel basis, and all pixels may be expected to exhibit some variance, higher variance values may occur in particular regions, such as region 80, due to the presence of particular objects. High variance values may affect the reliability or utility of the image data. Reference numeral 82 (in variance map 78) represents a region of still higher variance in the variance map 78 caused by the presence of high density objects 76 in the image 70 shown in FIG. 3. That is, reference numeral 82 indicates regions of uncertainty in the image 70 due to the presence of the high density objects 76. The variance map shown in FIG. 4 may be utilized to visualize the variance of regions of the image due, for example, to one or more features or high density objects in the image 70, thereby providing useful analysis to a radiologist as described in greater detail below.

Figure 5:
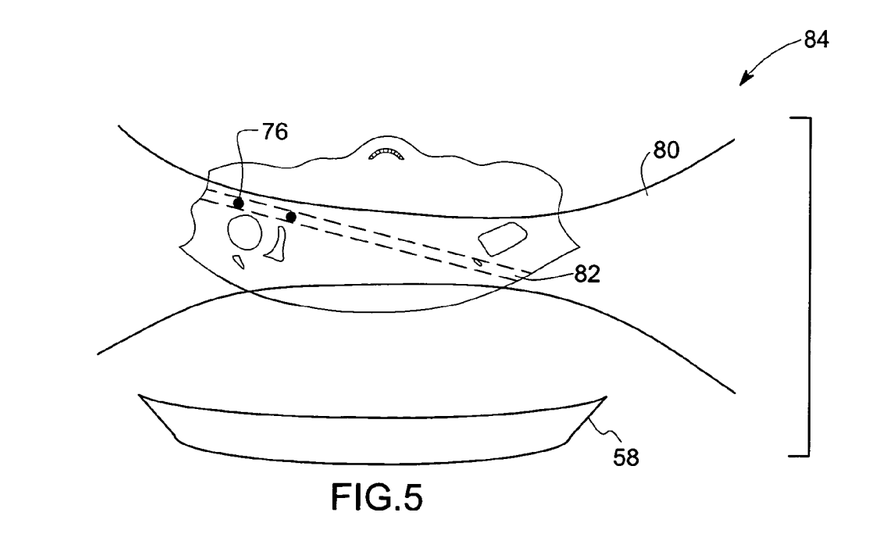
FIG. 5 is a diagrammatical representation of a digital composite image of the image shown in FIG. 3 and the variance map of FIG. 4.

FIG. 5 is a diagrammatical representation of a digital composite image 84 of the image 70 shown in FIG. 3 and the variance map 78 of FIG. 4. As indicated in FIG. 5, the digital composite image 84 is an overlay of the variance map 78 of FIG. 4 and the slice image 70 of a neck-shoulder region of the subject of interest 18 of FIG. 3. The digital composite image 84 provides visual cues as to high noise regions in the reconstructed image. As indicated in FIG. 5, the high noise regions may be indicated by the presence of bright streaks signifying regions of higher variance 82 and may occur in the vicinity of the high density objects 76.

As will be appreciated by those skilled in the art, the variance data computed as summarized below may be used and visualized in many ways. For example, the variance data may be mapped as shown in FIG. 4 to provide an indication of image data quality and reliability. Such visualizations may be entirely separate from displays of the corresponding reconstructed image. Alternatively, the map may be simply overlaid with the reconstructed image, or used to alter the image in any desired respect. For example, the relative values of the variance may be used to alter each pixel of the reconstructed image, such as by changing the hue saturation and value to reflect the relative variance of each pixel in the image. As summarized below, a user viewing the combined image is thereby alerted to the relative reliability of the image data in light of the variances of the pixel data.

Figure 6:
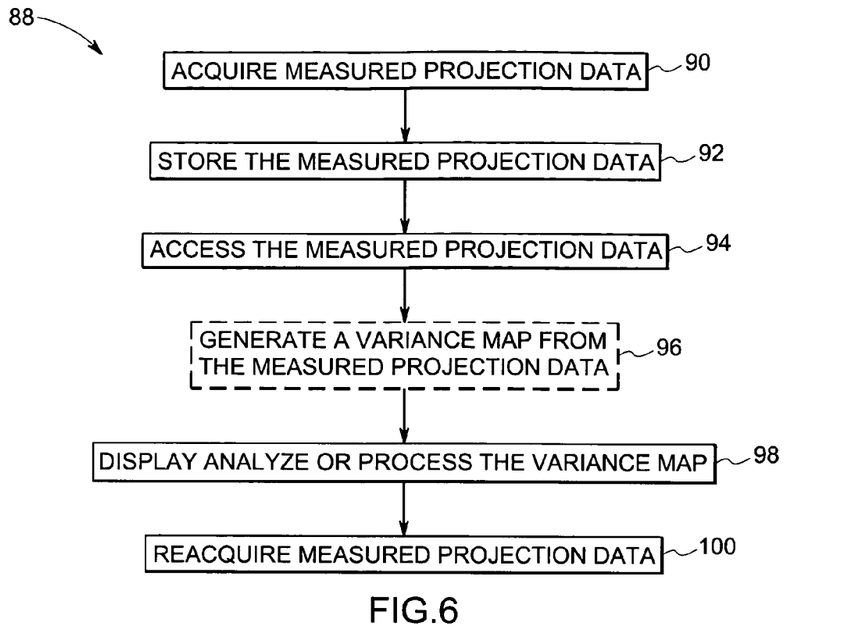
FIG. 6 is a flowchart describing exemplary steps for generating and displaying variance image data in accordance with embodiments of the present technique to permit display and analysis of the data and of images of the type shown in the previous figures.

FIG. 6 is a flowchart of exemplary logic 88 including exemplary steps for generating variance data from projection data and for displaying a variance map in accordance with embodiments of the present technique to permit display and analysis of the images of the type shown in FIGS. 3-5. In accordance with a specific embodiment of the present technique, the projection data comprises measured projection data. However, the projection data may also comprise simulated projection data or reconstructed image data. In step 90, the measured projection data is acquired by the computed tomography system 10. In step 92, the measured projection data is stored. Referring to FIG. 1, the measured projection data may be stored in the memory 38, located at the data acquisition system 34 or stored at remote components. In step 94, the measured projection data is accessed for processing to identify variances in the pixel data. In an exemplary embodiment of the present technique, the processing comprises generating variance data, and where desired, a variance map from the measured projection data in step 96, as will be described in greater detail below. In step 98, the variance map may be displayed or processed for diagnostic purposes as will also be described in greater detail below.

It should be noted that processing of the measured and stored data may occur at the time of acquisition or subsequently, as in post-processing of the data. Thus, the processing may occur at the CT scanner, or completely remotely from the scanner and at some subsequent time. Moreover, certain of the functions and processes summarized in FIG. 6 and discussed below may be optional. Such optional processes may be performed, for example, only upon request or command of an operator.

As indicated at step 100, measured projection data may be reacquired based upon the variance data computed. Such reacquisition may be useful for adapting a subsequent acquisition sequence by altering the acquisition system settings based upon the variance map. For example, a subsequent acquisition may be performed at a higher dosage to permit an enhanced image to be reconstructed with greater analytical or clinical value. The present technique thus greatly facilitates the analysis process by permitting rapid analysis of the reliability of image data and reacquisition, where appropriate, obviating the need to schedule a second, subsequent imaging session.

Figure 7:
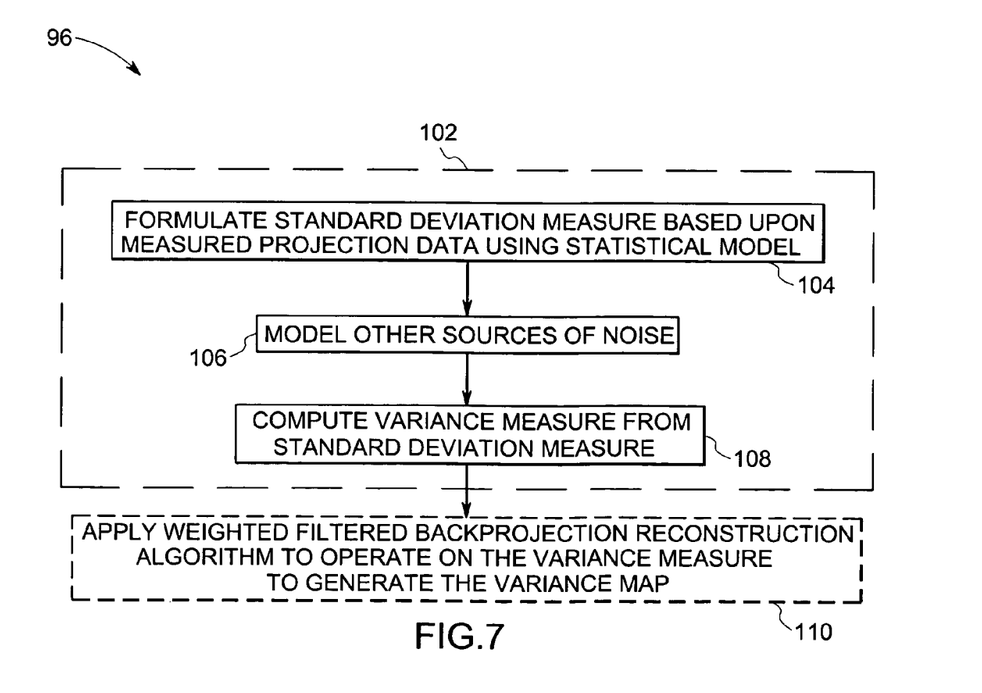
FIG. 7 is a flowchart describing in greater detail certain exemplary manners for implementing the process of FIG. 6.

FIG. 7 is a flowchart summarizing in greater detail exemplary processes that may be included in determining the variance data or variance measure summarized in step 96 of FIG. 6. In step 102, a variance measure is formulated based upon the measured projection data. In accordance with the present technique, the variance measure is formulated or computed by replacing the measured projection data by an estimate of the signal variance. In case of X-ray CT, the estimate of the signal variance is determined by assuming that the measured projection data are Poisson random variables. In case of high count rate CT, the estimate of the signal variance is determined by assuming that the measured projection data is normally distributed with a standard deviation equal to the square root of the mean.

Steps 104, 106 and 108 describe in greater detail the formulation of the variance measure in accordance with one implementation of the present technique. In step 104, a standard deviation measure is formulated based upon the measured projection data using a statistical model.

In a specific embodiment of the present technique, the statistical model for noise measurement, is formulated as follows, wherein the distribution of variance measures is represented by the relationship p~

$$N\left(\bar{p}, \frac{1}{\sqrt{I_0}} e^{\bar{p}/2}\right) \quad (1)$$

and wherein p refers to the line integral of the X-ray attenuation coefficient corresponding to the measured projection data, N describes a normal distribution of the p-values, Io refers to the intensity in air, and $\bar{p}$ refers to the mean value of p. As will be appreciated by those skilled in the art, because the value of p obtained is noisy and comes from a random process, $\bar{p}$ is not ideally available and the value of $\bar{p}$ is approximated by p in practice.

Referring again to equation (1), the mean of p, that is, $\bar{p}$ is obtained by computing a ratio of the negative logarithm of the intensity of the measured projection data (I), to the intensity in air (Io), which may be expressed as follows:

$$p = \bar{p} = -\log(I/Io) \quad (2)$$

and the standard deviation of p is expressed by the equation, $$SD(p) = \frac{1}{\sqrt{I_0}} e^{\bar{p}/2} \quad (3)$$

where Io is a measure of the number of photons collected by each detector and by each projection view in air (that is, when there is no object).

In step 106, various other sources of noise or measures of uncertainty due to other physical effects may be modeled and calculated from the measured projection data. One such measure of uncertainty, for example, could be based upon the path length or integrated attenuation associated with the measured projection data. At step 108, the variance measure is computed from the standard deviation measure derived in equation (3). It should be borne in mind that the measured projection data that is input into the statistical model is, in a presently contemplated embodiment, offset corrected and normalized, before taking the logarithmic value. Some other examples of noise processes that may be incorporated into step 106 include models for electronic noise in the data acquisition system, and quantization errors that arise from analog to digital conversion.

The above steps describe the process of formulating a statistical relationship and statistical model between the measured projection data and the estimate of the variance measure associated with the measured projection data, in accordance with a specific embodiment of the present technique. However, as will be appreciated by those skilled in the art, the particular relationship between the measured projection data and the estimate of the variance measure may be altered based upon one or more of the processing steps involved in handling the measured projection data prior to reconstructing the image.

At step 110, a weighted filtered backprojection reconstruction algorithm is used to operate on the variance data to generate the variance map as will be described in greater detail below. In practice, other reconstruction algorithms may be employed for generating the variance map based upon the variance data.

Figure 8:
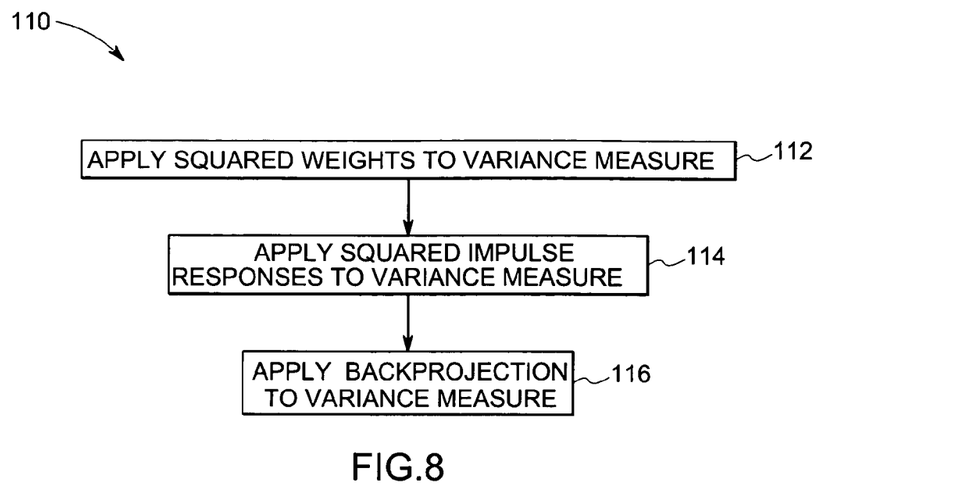
FIG. 8 is a flowchart describing in greater detail certain other exemplary steps that may be included in the process of FIG. 7.

FIG. 8 is a flowchart summarizing in somewhat greater detail, a manner in which the analytical reconstruction algorithm may be employed to generate the variance map as summarized at step 110 in the flowchart of FIG. 7. In accordance with one embodiment of present technique, the variance measure based upon the measured projection data obtained by a statistical model (e.g. as summarized in Equation 1) is processed by an analytical technique. In a presently contemplated embodiment, the technique includes a series of weighting, filtering and backprojection steps to generate the variance map, in a process known as weighted filtered backprojection (WFBP). In a specific embodiment of the present technique, a weighted filtered backprojection algorithm is used to generate the variance map. However, as will be appreciated by those skilled in the art, the present technique for generating a variance map may be applied to other analytical reconstruction algorithms such as Fourier-based algorithms, hierarchical algorithms, or coarse reconstructions based on downsampled projection data and/or image data.

As will be appreciated by those skilled in the art, a typical WFBP technique comprises the steps of weighting, filtering and backprojection of data for each projection measurement over the reconstruction volume. The weighting of the projection data is performed with a point-by-point multiplication by a (potentially pre-calculated) 2D array. The filtering or convolution step filters the image data to decorrelate data points, and may be carried out as a series of one-dimensional convolutions. In the backprojection step, the projection measurements are added to all pixels in an image along the lines of the original projection paths.

As summarized in FIG. 8, in accordance with a specific embodiment of the present technique, the generation of the variance map using a WFBP algorithm comprises the following steps. In step 112, the squared weights are applied to the variance measures. That is, in the weighting step of the WFBP algorithm, each variance measure is weighted by a factor of w*w (where w refers to the weighting in the original WFBP algorithm). In step 114, responses of the variance measures to a squared filter are applied. That is, the filter responses are squared, wherein each variance measure is convolved with the square of the sequence or impulse response, that is, h(n)*h(n) (where h(n) refers to the impulse response). In step 116, backprojection is applied to the variance measures. That is, each pixel variance measure is updated with a detector value multiplied by the square of the weight used in regular backprojection. For example, in fan beam backprojection for WFBP, the update comprises dividing by a factor of $L^4$, where L is the distance from the pixel to the X-ray source. Thus, as a result of the steps 112, 114 and 116, a variance map comprising pixel variances is generated from the WFBP algorithm as described above. Note that because the variance map tends to be smoother than the original image data, fast algorithms for backprojection/reconstruction may be used with a lower impact on overall quality. For example, Fourier-based backprojection techniques or hierarchical techniques may be used, as well as techniques based on links or multi-level domain decomposition methods.

Figure 9:
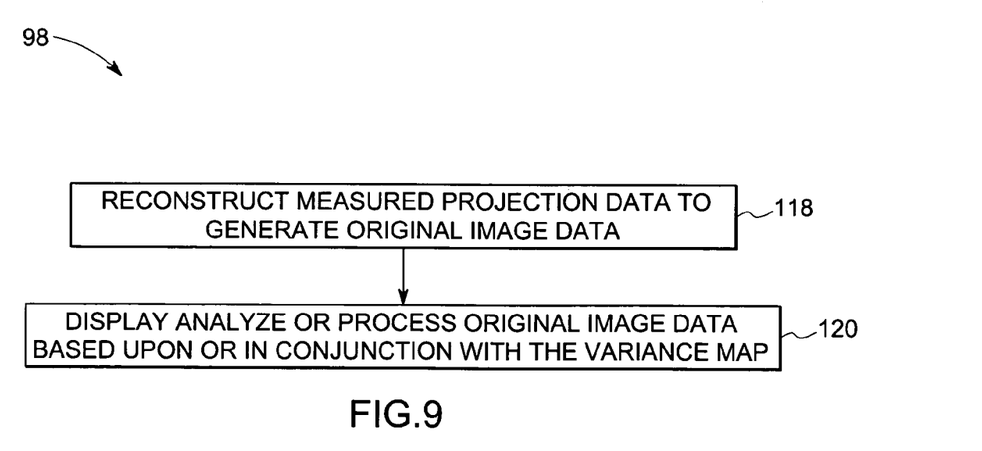
FIG. 9 is a flowchart describing in greater detail exemplary manners in which the variance image data may be employed.

FIG. 9 is a flowchart summarizing in somewhat greater detail, exemplary steps for displaying, analyzing or processing the variance image data or variance map summarized in step 98 of FIG. 6. In step 118, the measured projection data is reconstructed to generate original image data 70 as shown in FIG. 3. In step 120, the variance map generated in step 96 in FIG. 6 is displayed, analyzed or processed based upon the original image data 70 (as shown in FIG. 4). As described above, the variance map generated in accordance with the present technique provides visual cues to the high noise regions in the reconstructed image. In addition, the variance map may be used to provide for improved accuracy in computer aided detection (CAD) and classification algorithms that utilize variance information. The information may, in fact, be used to adapt such CAD techniques for specific use of the variance data, such as by adjusting sensitivity, confidence, or other parameters employed by the algorithms. Moreover, the data provide for visual cues to identify image features that may result from or that may be affected by structured noise as opposed to object structure/anatomy. Where desired, the variance data may be used to calculate performance bounds on detection algorithms by propagating the variances into the decision making process of the detection algorithm, as in a CAD algorithm as discussed above. Similarly, also as mentioned above, the data may be used to compute confidence bounds on actual pixel values that reflect the variability caused by the measurement error noise, and compute confidence bounds on object size estimates wherein objects segmented out from reconstructed datasets may have measurement errors propagated into them from the pixel values. Further, as noted above, based upon the variance analysis, the data may be used as a basis for recommending or even automatically performing reacquisition of image data from an acquisition system, such as to obtain new data that may exhibit less variance. In addition, in accordance with the present technique, a portion of the variance map may be computed for a smaller region of interest. Similarly, the variance for all image pixels do not necessarily have to be computed separately, and a direct calculation of variance may be made for an entire image region.

The following paragraphs describe in greater detail, a plurality of further applications that explain the use of variance measures and variance maps formulated in accordance with the present technique in a plurality of image processing, detection, quantification, measurement, and visualization applications.

The variance measure formulated in accordance with the present technique may be utilized to perform interpolation on image data. Interpolation techniques include, for example, bi-linear, tri-linear, bi-cubic and tri-cubic interpolation. Existing interpolation techniques perform interpolation using a single scalar value, such as the mean CT value. In accordance with the present technique, interpolation of both mean and variance measures may be performed either in an independent fashion or simultaneously with existing interpolation techniques. Further, interpolation techniques utilizing variance measures in accordance with the present technique produce intermediate scalar values (in any number of dimensions) that weight data values based on confidence bounds or measures.

The variance measure formulated in accordance with the present technique may be utilized in image filters, such as for example, in noise reduction filters to adaptively smooth images. The image filters may be adapted to accept, use, and formulate variance measures for each pixel in accordance with the present technique by using a weighted average of neighboring pixel intensities, wherein the weighting of the pixels is based, for example, on the inverse square root of the variance at a neighboring pixel location.

Moreover, the variance measure formulated in accordance with the present technique may be utilized in edge detection techniques. Edge detectors, such as, for example Canny edge detectors may use variance measures to determine confidence measures for second derivative zero values comprising edge events. In addition, knowledge of the local variance or variance measure enables the computation of the signal-to-noise ratio (SNR) of image data used to estimate the accuracy of the location of detected edges. As will be appreciated by those skilled in the art, some edge detection techniques rely on threshold values to determine start and stop points for connecting local edge components. Knowledge of variance measures may then be used to determine optimal threshold values.

The variance measure formulated in accordance with the present technique may be also utilized in object segmentation techniques and object sizing techniques to determine confidence bounds or measures on object sizes. Object sizing techniques include, for example, thresholding and gradient-based methods, such as watershed techniques and edge detector techniques. In accordance with the present technique, an object may be characterized, for example, via a threshold value at a median density value with a standard deviation value of +/−1 resulting in the creation of a plurality of iso surfaces indicating surface location with confidence bounds. The information thus obtained may be used to size objects to fit anatomical locations. In addition, the variance measure formulated in accordance with the present technique may be utilized to modulate gradient-based deformable models for segmentation. More specifically, variance measures may be used to provide an uncertainty estimate for the gradient at each location, which may be used to accelerate or slow-down the growth of the deformable models.

Variance measures formulated in accordance with the present technique may be further utilized to provide confidence bounds or measures for segmentation techniques that employ region growing (or shrinking) techniques. Existing region growing (and shrinking) techniques typically add pixels to (or subtract pixels from) a region based solely on intensity values. Variance measures act as confidence bounds or measures in region growing techniques, wherein a decision to add a pixel to a region may be augmented by variance information. Similarly, variance measures may be applied in region merging techniques, wherein a decision to merge two or more regions may be augmented using variance information.

Furthermore, the availability of variance data or measures enables greater accuracy in segmentation techniques and material classification, and provides for improved model fitting. Variance data may be used to define the probability distributions on image intensity profiles under competing anatomical hypotheses with greater accuracy. Anatomical models typically model the presentation of anatomy in a noise-free device. A variance map generated in accordance with the present technique may be incorporated in a conditional probability distribution on data from an imaging device given the noise-free image. In addition, variance data may be propagated to calculate confidence bounds or measures on the probability of a model, wherein variance information may be used to fit models to data described by the models. Variance information may additionally be used to compute confidence bounds or measures for various materials, such as to compute the statistical significance of changes in nodule sizing, nodule calcification, fat content in liver lesions or iodine uptake in contrast subtracted exams, to mention but a few medical applications. Variance information may also be used to improve the accuracy of perfusion algorithms where small changes in CT number are correlated to tissue function.

Variance measures formulated in accordance with the present technique may also be utilized in multi-dimensional display and visualization techniques. For example, iso-contours may display the surface +/−N standard deviation values in addition to the mean contour value. Similarly, surfaces may display additional standard deviation surfaces, facilitated by transparency. Volume-rendering techniques may make use of variance measures to provide the mean and +/−N standard deviation colors/opacities that are accumulated during volume rendering.

Variance measures formulated in accordance with the present technique may be further utilized in low-dose imaging techniques wherein variance maps are used to design conformal 'bowtie' shaped filters to control the photon flux and the hardness of the spectrum to deposit photons only where specifically needed. Further, dosage may be based on image region quality, wherein low dosage is provided to image quality regions of low interest. In addition, dose optimization and flux control may be applied prior to scanning (for example, using scout imaging information, prior CT scans, protocol optimization, CT scanner design) or during a scan (for example, using real-time scanning information and/or feedback from a clinician).

The embodiments illustrated and described above thus provide a technique for the efficient generation of variance data and variance maps to provide additional information about measured projection data and reconstructed images useful for analysis and, in the medical context, diagnosis. In addition, the technique for generation of the variance map is computationally efficient because changing of the weighting factors and squaring the filter impulse response steps using the weighted filtered backprojection reconstruction algorithm in accordance with the present technique, may be performed offline, resulting in no change in the computational cost of the process of generating the variance map. Also, the variance measure may be computed in the same number of operations it takes to compute the mean pixel value. That is, the generation of the variance map in accordance with the present technique does not require any additional measurements to determine the variance measure. Furthermore, the present technique may be applied to CT reconstruction algorithms from any geometry, such as for example, 2D, 3D, 4D, axial, helical, cone beam, and so forth. Moreover, the generation of the variance maps in accordance with the present technique is directly applicable to any generation or type of CT imaging system. Also, the variance maps generated in accordance with the present technique may also be generated from other tomographic systems, such as, for example, PET, SPECT, MRI, etc. In addition, the variance maps generated in accordance with the present technique may be generated from other tomographic and non-tomographic imaging modalities such as for example, MR, US, optical, EIT, X-ray etc.

As will be appreciated by those skilled in the art, the embodiments and applications illustrated and described above will typically include or be performed by appropriate executable code in a programmed computer. Such programming will comprise a listing of executable instructions for implementing logical functions. The listing can be embodied in any computer-readable medium for use by or in connection with a computer-based system that can retrieve, process and execute the instructions. Alternatively, some or all of the processing may be performed remotely by additional computing resources based upon raw or partially processed image data.

In the context of the present technique, the computer-readable medium is any means that can contain, store, communicate, propagate, transmit or transport the instructions. The computer readable medium can be an electronic, a magnetic, an optical, an electromagnetic, or an infrared system, apparatus, or device. An illustrative, but non-exhaustive list of computer-readable mediums can include an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer readable medium may comprise paper or another suitable medium upon which the instructions are printed. For instance, the instructions can be electronically captured via optical scanning of the paper or other medium, then compiled, interpreted or otherwise processed in a suitable manner if necessary, and then stored in a computer memory.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A method for generating a variance map from measured projection data acquired from a tomography system comprising:
   accessing the measured projection data from the tomography system;
   formulating a variance measure based upon the measured projection data; and
   generating the variance map from the variance measure using a reconstruction algorithm.

2. The method of claim 1, comprising determining variability of a mean pixel value caused by noise factors and artifact factors associated with the measured projection data based upon the variance measure.

3. The method of claim 1, wherein formulating a variance measure is based on a statistical model.

4. The method of claim 1, wherein the reconstruction algorithm is a weighted filtered backprojection reconstruction algorithm.

5. The method of claim 1, wherein the reconstruction algorithm is a fast reconstruction algorithm such as a Fourier-based algorithm, a hierarchical algorithm, or a coarse reconstruction based on downsampled projection data and/or image data.

6. The method of claim 4, wherein the reconstruction algorithm is adapted to operate on the variance measure to generate the variance map.

7. The method of claim 1, further comprising displaying, analyzing or processing the variance map.

8. The method of claim 1, wherein the measured projection data is reconstructed to generate original image data and wherein the original image data is displayed or analyzed based upon or in conjunction with the variance map.

9. The method of claim 1, further comprising identifying features of interest in the original image data based upon the variance map.

10. A method for generating a variance map from measured projection data acquired from a tomography system comprising:
    accessing the measured projection data from the tomography system;
    formulating a variance measure based upon the measured projection data;
    generating the variance map based upon the variance measure using a reconstruction algorithm; and
    displaying, analyzing or processing the variance map.

11. The method of claim 10, comprising determining variability of a mean pixel value caused by noise factors and artifact factors associated with the measured projection data based upon the variance measure.

12. The method of claim 10, wherein formulating a variance is based upon a statistical model.

13. The method of claim 10, wherein the reconstruction algorithm is a weighted filtered backprojection reconstruction algorithm.

14. The method of claim 13, wherein the reconstruction algorithm is adapted to operate on the variance measure to generate the variance map.

15. The method of claim 10, wherein the measured projection data is reconstructed to generate original image data and wherein the original image data is displayed, analyzed or processed based upon the variance map.

16. The method of claim 10, further comprising identifying features of interest in the original image data based upon the variance map.

17. A tomography system for generating a variance map from measured projection data comprising:
    an X-ray source configured to project a plurality of X-ray beams through an object;
    a detector configured to produce a plurality of electrical signals in response to received X-ray beams from the source; and
    a processor configured to process the plurality of electrical signals to generate measured projection data, wherein the processor is further configured to access the measured projection data from the tomography system; to formulate a variance measure based upon the measured projection data; to generate a variance map based upon the variance measure using a reconstruction algorithm; and to display, analyze or process the variance map.

18. At least one non-transitory computer-readable medium storing computer instructions for instructing a computer system for generating a variance map from projection data acquired from a tomography system, the computer instructions comprising:
    accessing the projection data from the tomography system;
    generating a variance map from the projection data; and
    displaying, analyzing or processing the variance map.

19. A tomography system for generating a variance map from measured projection data comprising:
    means for accessing the measured projection data from the tomography system;
    means for formulating a variance measure based upon the measured projection data;
    means for generating the variance map based upon the variance measure using a reconstruction algorithm; and
    means for displaying analyzing or processing the variance map.

* * * * *

UNITED STATES PATENT AND TRADEMARK OFFICE
CERTIFICATE OF CORRECTION

PATENT NO.       : 8,111,889 B2  
APPLICATION NO.  : 10/813758  
DATED            : February 7, 2012  
INVENTOR(S)      : Basu et al.

Page 1 of 1

It is certified that error appears in the above-identified patent and that said Letters Patent is hereby corrected as shown below:

In Column 8, Line 3, delete "lo" and insert -- Io --, therefor.

In Column 13, Line 30, in Claim 5, delete "such as" and insert -- comprising at least one of --, therefor.

Signed and Sealed this
Second Day of October, 2012

David J. Kappos
*Director of the United States Patent and Trademark Office*